(12) United States Patent
Grimes

(10) Patent No.: X8518
(45) Date of Patent: Dec. 2, 1834

(54) BRICK PRESS

(76) Inventor: William C. Grimes

United States Patent
Patent No.: X8518
X 8518
W. C. Grimes,
Brick Machine,
Patented Dec. 2, 1834.
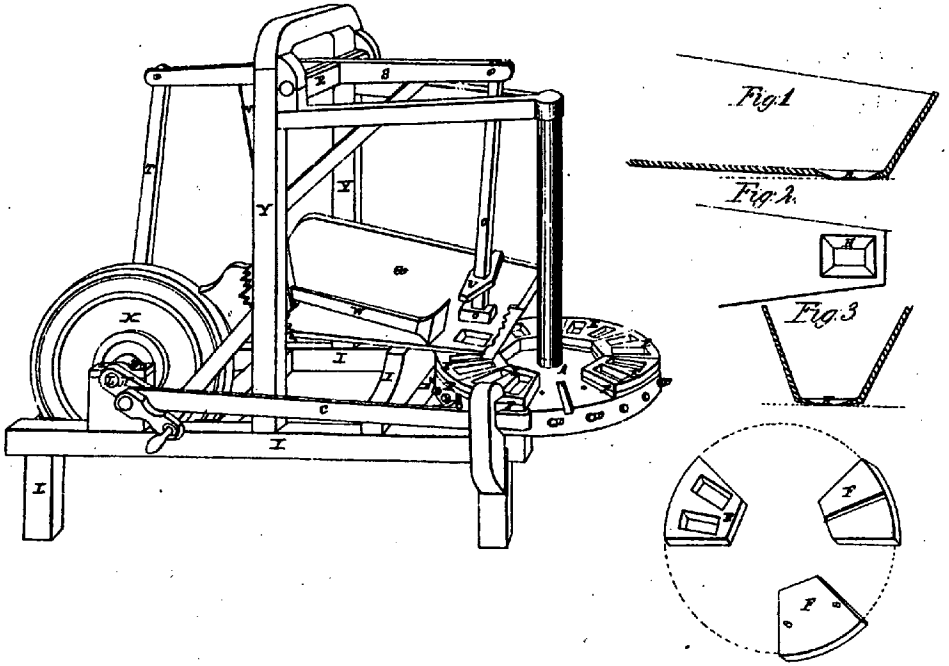
A.M. PHOTO-LITHO. CO. N.Y. (ORIGINAL PRINT)